UNITED STATES PATENT OFFICE.

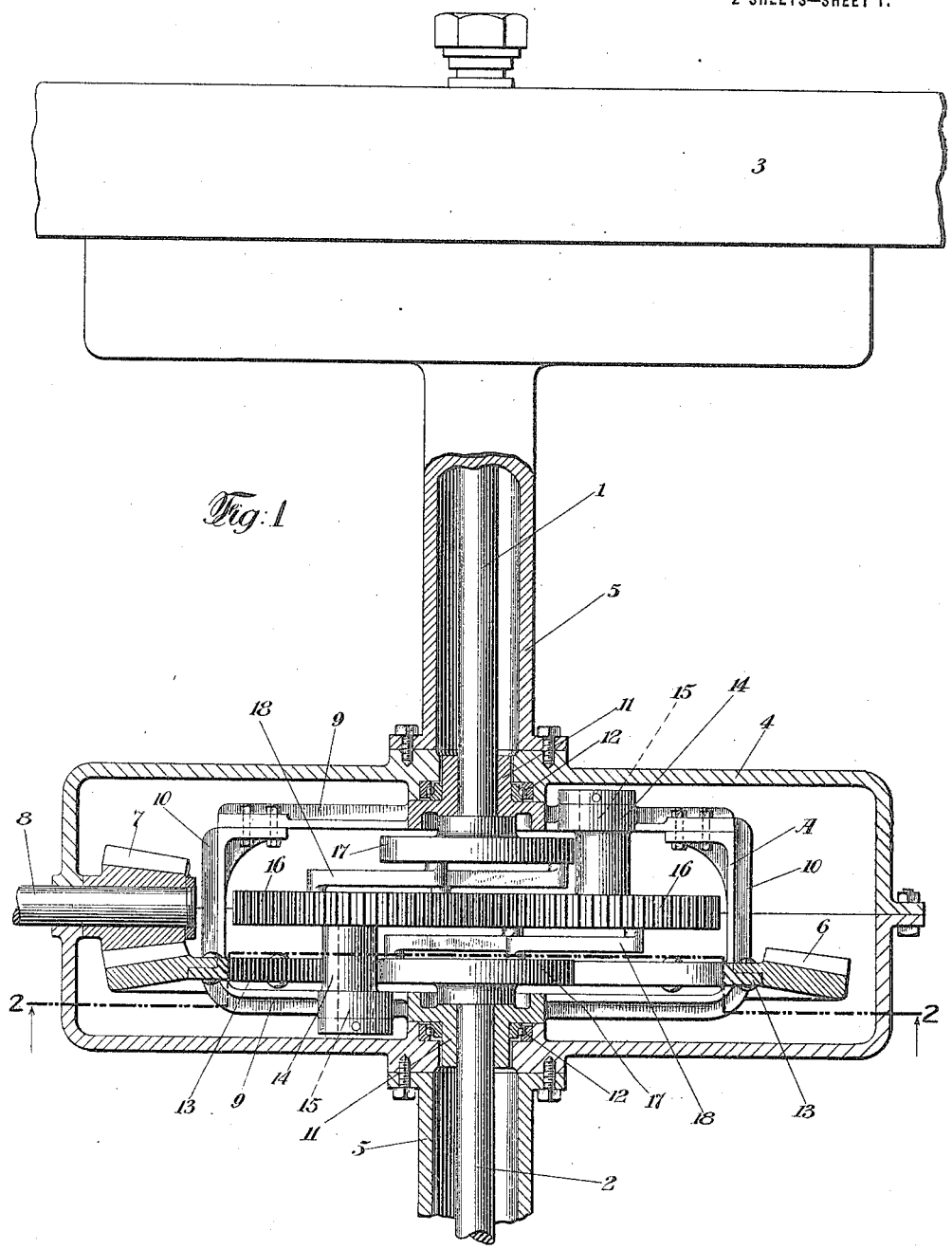

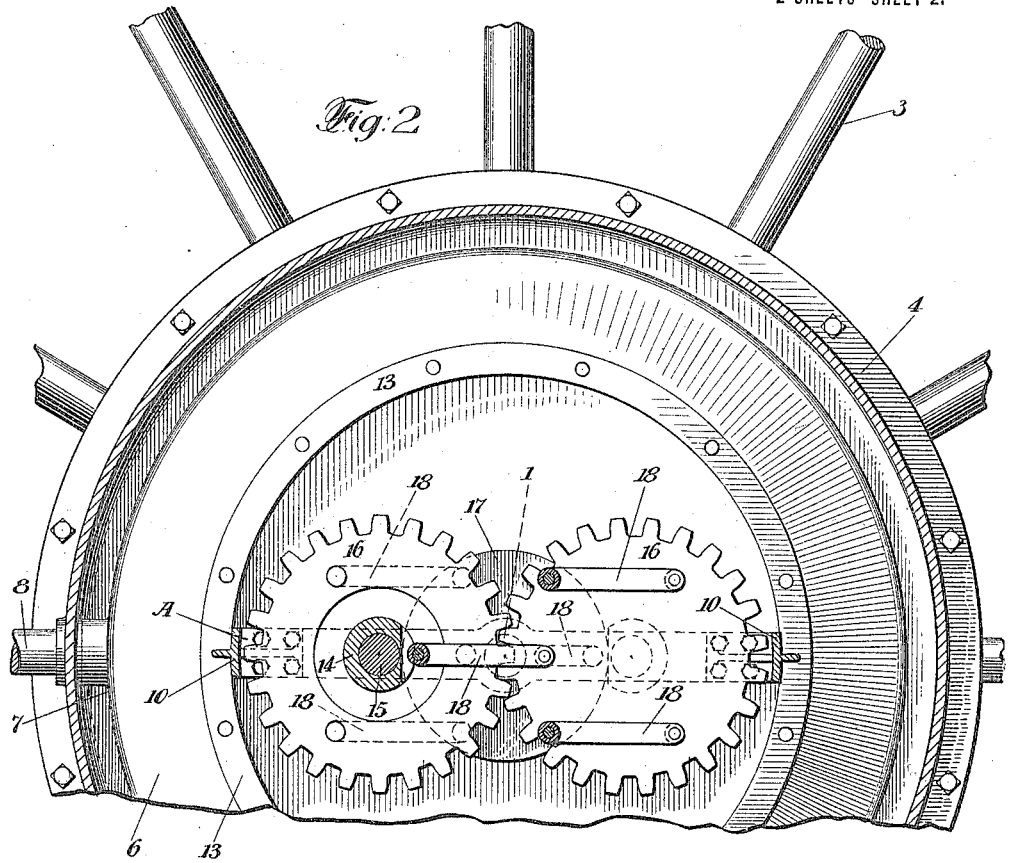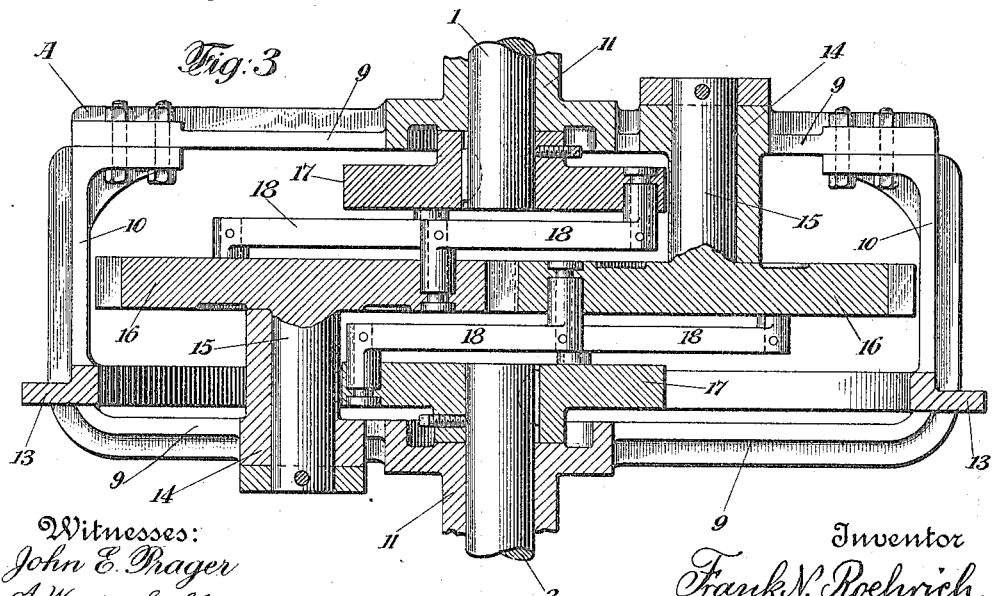

FRANK N. ROEHRICH, OF JERSEY CITY, NEW JERSEY.

DIFFERENTIAL DRIVING MECHANISM.

1,180,079.         Specification of Letters Patent.         Patented Apr. 18, 1916.

Application filed April 25, 1912, Serial No. 693,073.   Renewed June 1, 1914.   Serial No. 842,253.

*To all whom it may concern:*

Be it known that I, FRANK N. ROEHRICH, a citizen of the United States, residing at Jersey City, in the county of Hudson and State of New Jersey, have invented certain new and useful Improvements in Differential Driving Mechanism, of which the following is a specification.

This invention relates to differential driving mechanism adapted for use, more especially, in connection with the axle shafts of motor driven vehicles, such, for example, as automobiles.

The object of my invention is to provide a mechanism of the kind referred to which shall combine, in its construction and operation, the merits of simplicity, cheapness, durability and efficiency.

To this end, the invention, as generally stated, comprehends various novel features of construction and combinations of parts which will be hereinafter described and claimed.

The particular form of embodiment of the invention herein selected for illustration consists in the provision between the elements to be driven, such, for example, as the axle shafts of a pair of traction wheels, of a rotatable head equipped with a pair of intermeshing spur wheels which are mounted with spaced relation to the inner ends of the shafts, crank and link connections between one of the gear wheels and one of the shafts, and similar though oppositely-disposed connections between the other gear wheel and shaft, as will presently appear.

While I shall hereinafter point out in detail the structural features of the illustrative mechanism above indicated it is to be understood that my invention is not restricted to the details to which reference may be made, as the structure may be modified in many respects without departure from the fair spirit of the invention.

In the drawings—Figure 1 is a transverse horizontal section of differential driving mechanism embodying the preferred form of my invention, showing a portion of a traction wheel on one of the driven shaft elements. Fig. 2 is a transverse vertical section, as on the line 2—2 of Fig. 1. Fig. 3 is a transverse horizontal section, enlarged, through the rotary head and its contained elements, the gear ring on the head being omitted.

1, 2 designate two elements to be driven, the same being illustrated as the two alining axle shafts of an automobile. 3 is a portion of a traction wheel carried by one of said shafts, and 4 is a cylindrical casing bolted or otherwise secured to the inner ends of the fixed tubular casings 5 for the shafts, these parts being of any usual or approved construction.

Within the casing is mounted axially of the shafts a rotary head A which is equipped at or near one of its sides with a bevel gear ring 6 in engagement with a bevel gear wheel 7 on the inner end of the power driven shaft 8, such inner end having its bearing in the wall of the casing 4. Thus the head is bodily rotated on its axis by actuation of the shaft 8 from a suitable source of power. This head in its preferred construction embodies a rectangular skeleton frame composed of the spaced side and end members 9, 10 respectively. The side members are provided with suitably-disposed hubs 11 which are journaled, preferably upon ball bearings 12, (Fig. 1) in the respective sides of the casing 4, the inner ends of the axle shafts extending axially through the hubs into the interior of the head as shown. The ends of the frame, adjacent one side thereof, are provided with a flanged ring 13 to which is bolted or otherwise secured the bevel gear ring 6. Journaled in suitable bearings 14 in the respective sides 9 of the frame are two inwardly extending stub shafts 15 which are disposed at diametrically opposite points equidistant from the axis of the head. On the inner ends of these shafts are two crank members 16 constituted in the present instance by two similar intermeshing gear wheels which are located midway between the sides of the head, or nearly so.

On the inner ends of the axle shafts are fixed crank disks 17 which are connected with the respective gear wheels 16 by means of two oppositely-disposed sets of lateral link connections 18. In the present case there are three links for each gear wheel and its complementary crank disk, which links, being of corresponding length, are pivotally connected at one end thereof to the disk, at equidistant points from the center of the latter, and at the other end to the gear wheel at equidistant points from its center; the pivotal points of the links at their respective ends being such that the approaching ends will escape each other during the relative rotation of the gear wheel and crank disk. Thus if the crank disk be free to rotate and its complementary gear wheel be rotated on its own axis uniform and positive transmission of motion from the rotating gear wheel to its connected shaft section will be effected irrespective of the position which the axis of the said gear wheel may occupy in a circular path described from the axis of the shaft. If, on the other hand, the crank disk be held against rotation, and its complementary gear wheel be bodily revolved about the axis of the head, the link connections between the gear wheel and the relatively fixed crank disk will effect the relative rotation of the gear wheel similarly to the planet wheel of a sun-and-planet motion.

From the foregoing it will be seen that the head A through its gear connection with the power shaft 8 is continuously rotated, thereby bodily rotating as a unit the gear wheels and their connected shafts 1, 2 in the same direction if the two shafts be equally free to turn or be subjected to corresponding traction conditions, as, for example, when the vehicle is traveling in a direct path; or, in other words, the opposing gear wheels by virtue of their respective link and crank connections with the two shafts normally lock the shafts axially to the head. If, however, during the rotation of the head one of the shafts (as 1) be held or restrained, (as, for example, when the vehicle is turning a curve) the link connections between that shaft and the gear wheel will effect and permit the independent rotation of the latter as the wheel is revolved by, and around the axis of, the head. Such rotating gear wheel will in turn rotate the gear wheel in mesh therewith and the latter through its link and crank connections with the shaft (as 2) will positively rotate the latter; or, in other words, when one of the shafts is held or restrained the rotating head transmits its motion through the relatively rotating gear wheels to the link and crank connections of the other shaft. The moment the abnormal resistance is removed from the restrained shaft, or the two shafts are subjected to equal force, the said shafts will be locked to the head through the counteraction of the respective link and crank connections and gear wheels, and thus be concurrently rotated axially with the head, as above described.

I claim—

1. In differential driving mechanism, the combination with two driven elements, of a rotary support, means for actuating said support, a crank member on one of said driven elements, a complementary crank member therefor mounted on the support, link connection between said crank members, a crank member on the other driven element, a complementary crank member therefor mounted on the support, link connection between the latter two crank members, and operative connection between the two crank members mounted on the support.

2. In differential driving mechanism, the combination with driven elements, of an interposed rotary support, means for actuating said support, intermeshing gear wheels independently mounted on said support, crank and link connections between one of said driven elements and one of said gear wheels, and crank and link connections between the other driven element and gear wheel.

3. In differential driving mechanism, the combination with driven elements, of an interposed rotatable frame in axial alinement with said elements, means for actuating said frame, intermeshing gear wheels independently mounted on said frame, crank and link connections between one of said driven elements and one of said gear wheels, and crank and link connections between the other driven element and gear wheel.

4. In differential driving mechanism, the combination with driven elements, of an interposed rotatable frame in axial alinement with said elements, a gear ring on said frame, a drive shaft, a gear thereon engaging the gear ring, intermeshing gear wheels independently mounted on said frame, crank and link connections between one of said driven elements and one of said gear wheels, and crank and link connections between the other driven element and gear wheel.

5. In differential driving mechanism, the combination of two driven shafts, of a rotatable frame into which extend the inner ends of said shafts, means for rotating said frame, intermeshing gear wheels independently mounted on said frame at diametrically opposite points equidistant from the axis of rotation of the frame, crank members on the inner ends of the shafts, a plurality of spaced link connections between one of said gear wheels and one of said crank members, and a plurality of spaced link connections between the other gear wheel and crank member.

FRANK N. ROEHRICH.

Witnesses:
JOHN E. PRAGER,
A. WORDEN GIBBS.